Dec. 15, 1959   E. W. MOORMAN ET AL   2,917,568
OXYGEN DELIVERY TUBE
Filed Oct. 25, 1956
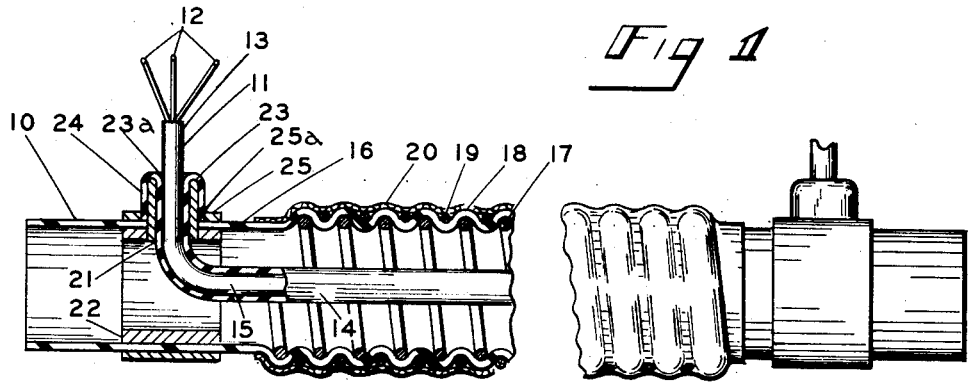
Fig 1
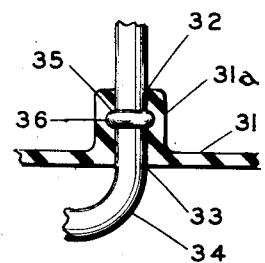
Fig 2
Fig 3
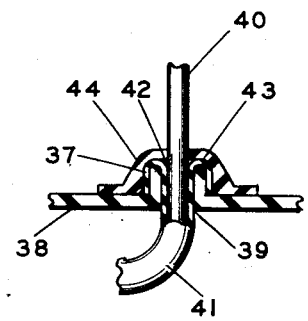
Fig 4
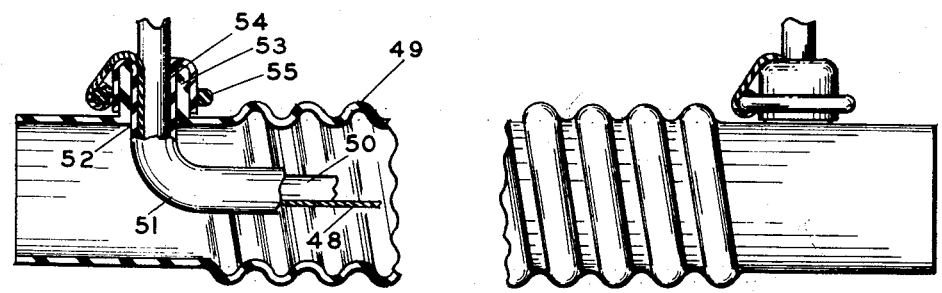
Fig 6
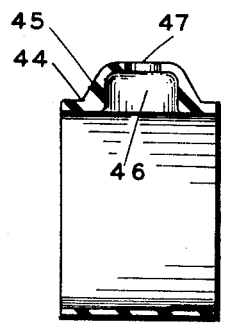
Fig 5
INVENTORS
EDWARD W. MOORMAN
HOWARD NOYES
BY
Reuben Wolk
ATTORNEY

United States Patent Office 2,917,568
Patented Dec. 15, 1959

2,917,568

OXYGEN DELIVERY TUBE

Edward W. Moorman and Howard Noyes, Dayton, Ohio, assignors to The Dayton Rubber Company, Dayton, Ohio, a corporation of Ohio Application October 25, 1956, Serial No. 618,253

9 Claims. (Cl. 174—47)

The present invention relates to conduit and cable assemblies wherein fluid transmission conduits are attached to or associated with cable or strand-like members such as radio communication wires.

While the conduits of the present invention may be used wherever it is desired to transmit a fluid, they are particularly suitable for use in personal pressure or breathing devices such as pressurized flying suits and oxygen supply systems wherein it is desired that radio communication wires be integrated therewith.

The need for the device of the present invention has been enhanced by the demands of high speed and high altitude flight wherein the body of persons making such flights must be surrounded by a suit and mask capable of providing a conditioned atmosphere. Since radio communication is also a vital part of such flight, provisions must be made for the penetration of the communication or similar impulses through the suit and mask into the conditioned atmosphere.

While satisfactory conduits for supplying the required fluid to the pressurized suits and to the breathing equipment are known to the art, there has previously been no provision for a satisfactory association with such conduits of a communication cable or strand. Particularly has this been so in the case of the most preferred fluid transmitting hoses since the same have had to be circumferentially reinforced against collapsing or bursting under the influence of the conditions under which they will be used and have had at the same time to be extremely flexible and light in weight so as not to encumber or impair the freedom of the body movement. The type of conduit most suitably filling these needs is one wherein a circumferential reinforcement in the form of one or more helical springs is positioned in the hose body which later is plicated or corrugated to enhance flexibility. Such hoses of the prior art have normally been provided in sections which can be readily joined together to provide the entire pressure or breathing system.

There is frequently a need for repeatedly connecting and disconnecting sections of the hose as in the case of a hose section associated with a helmet which must be disconnected from the remaining sections whenever the helmet is removed. In such cases it has been difficult to provide a communication cable associated with the hose section which can be removed with equal facility. Since the conduit must be capable of being separated section by section depending upon the state of the dress of the wearer, it has been impossible to supply a conduit or a communication cable thereon which is continuous throughout the entire hose system. In view of this, it has been considered necessary to supply the communication wire around the exterior of the hose and to provide suitable cable connecting means near each end of the sections to be joined. Since such connecting means must be associated with the communication cable exteriorly of the conduit sections, it has previously been considered unworkable and undesirable to place the cable within the hose, since an opening through the hose wall would be required for its association with such means. Such openings would represent a potential break in the required imperviousness of the hose wall which, in the case of personal pressure and breathing equipment, is a vital factor in the sustenance of life. Furthermore, the positioning of the cable within the conduit has been avoided particularly in the case of personal breathing equipment since the fluid (usually oxygen) passing within the conduit would be subject to contamination by contact with the cable. Beyond this, where the cable is transmitting an electrical impulse, the danger of igniting such gas would be ever present if the cable and the electrical charge were exposed thereto.

Accordingly, the communication cables have been associated with the hose either as a component of the wall thereof or as a winding about the exterior of such wall. In such cases however, it has been found that if the communication cable spans the distance between the connecting means at the ends of the section in a substantially straight line, it not only impairs the flexibility of the hose but is vulnerable to tearing therefrom. This is particularly true in the case of most of the prior art hoses in that the same are axially extensible whereas the communication cables are not. This means that where a force tending to elongate the hose is present, the hose will seek to elongate only to be retarded therein by the inextensible cable, allowing the hose to pull away from the cable. Consequently, it has been the practice to wind the communication cable circumferentially of the hose following the pattern of the corrugations of the wall thereof. While the communication cable would thus be more firmly associated with the hose, it tended to impair the flexibility of the hose and cable combination. At the same time, this circumferential and normally spiral winding of the cable about the hose consumed an unusually large length of cable for a given length of hose and thereby increased not only the cost but the weight of the assembly. Beyond this, the spiral winding of the cable about the hose has presented serious difficulty in the case of a cable employed for the transmission of radio signals in that such winding results in a coil effect which creates electrical conditions detrimental to the clear and unimpeded transmission of the radio signal.

It is accordingly an object of the present invention to provide an improved flexible conduit suitable for use in connection with a cable such as radio communication wire.

It is a further object of the present invention to provide such a conduit wherein flexibility will not be impaired by the presence of the cable, and the weight of the cable and hose assembly will not be unusually large.

It is a further object of the present invention to provide such a conduit wherein an inextensible cable may extend linearly throughout the internal passage of the hose and may pass through the hose walls for association with connecting means at the ends thereof without creating any hazard of a loss of imperviousness.

It is a further object of the present invention to provide such a conduit and cable assembly wherein the fluid passing through the conduit will not be in any way contaminated by contact with the cable positioned therein.

It is another object to provide a communication conduit having a minimum length and running in a substantially straight line to obtain maximum communication characteristics.

It is a further object of the present invention to provide an improved sealing or gasketing means about the openings in the hose wall required for the passage of the cable therethrough.

To achieve these and other objects and advantages of the present invention which will be apparent from a reading of the following disclosure, it is proposed to provide a reinforced flexible conduit having the communication cable linearly positioned within the passage thereof and passing through openings in the hose wall for association with the exteriorly positioned cable-connecting means. The problems encountered in thus positioning the communication cable within the fluid transmission passage of the hose are solved in the construction of the present invention by providing about the cable a fluid impervious sheath which, although it completely envelops and encloses the cable, is separate therefrom so that it may be folded away from the cable in effecting the necessary fluid tight seal at the openings in the hose walls defining the conduit passage through which the cable must pass in being joined to the means by which the individual lengths of cable and hose ultimately will be joined to form a greater length hose and cable system. The sheath thus enveloping the cable is permitted to pass with the cable through the openings in the conduit wall, but once it reaches the exterior of the conduit it is folded or otherwise manipulated so that it may be pressed against the hose wall itself. A projection is provided from the hose wall or against the cable to effect a fluid-tight seal which will result in the maintenance of the imperviousness of the hose system notwithstanding the provision in the individual hose sections of openings through which the interiorly positioned cable may pass.

The sheath, being impervious to the passage of any fluid such as may be transmitted in the conduit, will protect the communication wires surrounded thereby from being deleteriously affected by the gas and will at the same time prevent the gas or like fluid from being contaminated or in some cases ignited by the presence therewithin of the cable which may be transmitting an electrical impulse. At the same time, the portion of the sheath which is folded or otherwise manipulated about the exterior of the hose operates to preserve a seal not only of the openings through the hose wall but also of the cable from the fluid passing within the conduit passage. In view of these provisions, it is possible for the communication cable to pass in the most simple straight line direction through the body of the hose without the previously encountered increases in weight and cost which were always involved in the prior art constructions wherein the cable was located exteriorly or in the wall of the hose. At the same time, the positioning of the cable within the conduit passage has been found to result in no loss of flexibility and in fact has provided an additional improvement in cable and conduit assemblies of the type herein considered in that the assembly as a whole may be rendered axially inextensible by virtue of the inextensibility of the cable which is positioned therewithin. In certain instances however, particularly where the cable to be associated with the conduit is made up of one or more relatively fine wires such as those which are commonly employed in radio systems, it may develop that, notwithstanding the relative inextensibility of the cable, it should not be exposed to excessive tensional stresses such as would be encountered for example, if a pilot wearing such a conduit were to jump from his plane at high speeds to encounter wind resistance which would tend to elongate the assembly. In these instances where the cable within the conduit cannot be relied upon for inextensibility, the conduit may be reinforced with a strain relieving or protective strand or cord coextensive therewith which has a considerably higher tensile strength. Still a further refinement of the present invention involves the combination with the cable arrangement disclosed herein of a conduit which is formed in the first instance so that it will be reinforced against axial elongation and will therefore itself protect the cable linearly positioned therewithin from exposure to elongating forces.

The invention thus generally described as well as the principles, objects and advantages of the same may be more clearly understood by reference to the following detailed description of certain preferred embodiments thereof in connection with which reference may be had to the appended drawings.

In the drawings:

Figure 1 is a broken elevational view in partial cross section showing the construction of a preferred conduit, the positioning of a communication cable within the passage thereof and means for associating said cable with said conduit in such a manner as to achieve the purposes of the present invention.

Figure 2 is an elevational view in partial cross section showing a modification of the means for associating the communication cable with the wall or body of the conduit according to the present invention.

Figure 3 is an elevational view in partial cross section showing still another modification of a means for associating the cable with the conduit wall according to the present invention.

Figure 4 is an elevational view in partial cross section showing still another modification of a means for associating the cable with the conduit wall according to the present invention.

Figure 5 is a sectional view of the sleeve employed in the modification of Figure 4.

Figure 6 is an elevational view in partial cross section showing another hose and cable assembly according to the present invention.

Referring now to Figure 1, a conduit or hose suitable for use in personal oxygen or breathing equipment is designated by the reference numeral 10, while the cable for transmitting communication signals is designated by the numeral 11. The cable 11 may consist of one or more individual conductors 12 which may be insulated by a coating 13 which is like that normally employed in the electrical or radio art. This insulation or coating is to be distinguished from the sheath 14 which, according to the present invention, is provided to encase the cable 11 including the insulation 13 thereof at least throughout the length of the cable which is exposed to the inner passage 15 of the conduit 10.

The sheath 14 will usually be in the form of an elongated hollow tube of cylindrical cross section conforming to the cross section of the cable 11 and is preferably of such dimensions that the normal inside diameter of the sheath is equal to or even slightly less than the outside diameter of the cable 11 and the insulation 13 thereon so that, when the sheath is positioned over the cable, it will be slightly expanded and will therefore tightly embrace the cable 11. In the case of the preferred embodiment shown in Figure 1, the sheath is composed of an elastomeric or resilient material such as rubber or the various well-known synthetic rubbers or elastomeric plastic materials. The inside diameter is slightly less than the outside diameter of the cable 11, and may be elastically expanded to allow for the insertion of the cable within the sheath whereupon the latter may be released to elastically embrace the cable. As explained above, the sheath is of such a length that it will encase the entire portion of the cable 11 exposed to the conduit passage 15 and is of a suitable additional length to allow for the folding or other manipulation thereof at those portions near the openings in the hose wall through which the cable and sheath pass.

While the conduit 10 of the present invention may take the form of any of the conduits known to and previously used by the art in connection with personal breathing or oxygen equipment, the presence of the cable within the conduit passage and the retarding effect which it has upon the extensibility of the conduit with which it is firmly associated has made it possible to employ a conduit of very basic construction which is free of the expensive, heavy and flex-retarding reinforcements commonly used to provide resistance against axial elongation. As a result, where the cable 11 is not only inextensible but also of sufficiently high tensile strength to resist whatever forces tend to elongate the hose, a very thin and flexible hose wall free of any reinforcement may be employed. In such cases, the wall is normally made of a flexible elastomeric material such as rubber, synthetic rubber or an elastomeric plastic and, where even greater flexibility is desired, the same may be pleated or corrugated. On the other hand, the conduit may be made to resist axial elongation where the individual conductors 12 are delicate and should be protected from exposure to elongating forces.

Such a conduit construction which is itself reinforced against axial elongation is illustrated in Figure 1 wherein the conduit wall is shown to consist of an inner tubular layer 16 of elastomeric material about which are positioned a plurality of longitudinally spaced circumferential turns 17 of a reinforcement such as a helical spring wire. About the circumferential reinforcement 17 and the layer 16 is positioned a second tubular layer 18 which is preferably of an inextensible material such as a fabric coated or impregnated with rubber and which is corrugated to pass over the individual turns 17 of the circumferential reinforcement and to engage the inner tubular layer 16 therebetween. Within the troughs of the external corrugations of the layer 18 thus positioned about the reinforcing turns 17 is wound a secondary reinforcement in the form of an inextensible strand or cord 19 which acts to preserve the longitudinal spacing of the reinforcing turns 18 and thereby prevent the conduit from being elongated.

In certain cases where it is anticipated that the hose will be subjected to abrasion about its exterior surface, the construction thus far described may be completed by the application about the corrugated inextensible layer 18 and the inextensible cord or strand 19 positioned in the troughs thereof of an outer tubular layer 20 of elastomeric material which may surround and tightly embrace the previously assembled conduit components. Once again, it is to be understood that the specific type of hose construction to be employed is not a part of the present invention except insofar as the use of the inextensible cable 11 renders the use of an unreinforced conduit practical or insofar as the use of a conduit reinforced against axial elongation will cooperate with the cable to protect it from elongating forces. In all cases, however, the conduit and cable assemblies of the present invention require that the conduit passage 15 will be defined by a wall of some description which is impervious to the transmission of fluids such as are likely to be carried through the passage. In most cases such fluid imperviousness is best provided by a hose or conduit wall having as a basic component one or more layers of a fluid impervious elastomeric material such as rubber, synthetic rubber, certain of the elastomeric plastic materials, or combinations thereof.

Once the cable 11 and the sheath 14 surrounding the same pass through the opening 21 in the conduit wall, there are several expedients according to various modifications of the present invention by which an airtight seal between the interior of the conduit passage 15 and the exterior of the conduit and between the interior of the conduit and the cable 11 may be effected. In one form, a bushing 22, preferably of a metal or like rigid material having an outside diameter corresponding substantially to the inside diameter of the conduit may be positioned within the conduit passage to support the wall thereof at the area surrounding and immediately adjacent to the opening 21. In the usual case of conduits of cylindrical cross section, this bushing itself will be cylindrical and will have associated with that portion thereof registering with the opening 21 in the hose wall a projection 23 which itself is normally cylindrical and has a bore or channel 23a therethrough which is itself a cylindrical cross section and of such diameter as to allow for the passage of the cable 11 and the sheath 14 therethrough. This bore or channel 23a registers with the opening 21 through the hose wall so that the cable may pass conveniently from the conduit passage 15 through the hose wall to the exterior of the conduit. The sheath 14 is folded back over the projection 23 as shown at 24. The sheath 14 is composed of an elastomeric material and is of a uniform diameter throughout, and it can be seen that when it is folded over the exterior of the projection 23, the sheath will be expanded and will therefore elastically embrace the exterior surface of the projection so as to form a fluid-tight seal between the inner conduit passage 15 and the exterior of the conduit, as well as between the cable 11 and the gases within the conduit passage 15. To render this seal more permanent, suitable clamping means may be employed; and, in the case of the one preferred embodiment illustrated in Figure 1, these clamping means may be in the form of a circular, sleeve-like metal clamp 25 which surrounds the exterior of the conduit at the place opposed to that portion of the inner surface thereof which is supported by the bushing 22 and urges the hose wall against the exterior surface of the bushing. At the same time this clamping sleeve 25 may be provided with an opening 25a only slightly larger than the projection 23 which passes therethrough so that the sleeve will also urge the folded portion 24 of the sheath 14 into sealing relationship with the projection. Normally, however, the folded portion 24 of the sheath will be cemented or otherwise adhered to the exterior surface of the projection 23 and the clamping sleeve 25 will be relied upon solely to clamp the hose wall against the bushing 22 to effect an airtight seal between the projection 23 and the inner conduit passage 15. With the projection thus sealed, the folding of the sheath 14 over the rim thereof and the adhesion or cementing of the folded portion to the exterior surface of the projection results in a fluid tight seal between the sheath itself and the interior of the conduit.

A modification of the means for effecting the desired fluid seal is shown at the opening 21a through the hose wall in Figure 2 wherein the opening is surrounded by an integrally formed projection 26 which is preferably composed of the same material as the conduit wall and is therefore of an elastomeric material. This projection 26 may be formed in the initial molding or early manufacturing stages of the hose and is such that it rises from the exterior thereof and has a channel or passage 27 passing therethrough communicating with the opening 21a and therethrough with the interior conduit passage 15a. Once again it will be noted that the cable 11a continues on through the channel 27 while the sheath 14a is folded about the projection at 28. To increase the sealing effect of this folding of the sheath about the rim of the projection, the rim may be provided with a bead or enlarged lip 29 so as to still further elastically deform the sheath 14a so that it will with more firmness elastically embrace the projection about which it is folded. In this particular modification, however, the clamping means may be in the form of a cord 30 which is tightly wrapped around the projection to urge it against that portion of the sheath 14a which is supported by the cable 11a as said sheath and cable are passing through the channel 27. The cord 30 thus wound forces the projection into contact with the projection and the sheath surrounding and supported by the cable on a closed line about the circumference of the sheath. To protect this cord 30 and to further insure the seal, the extending portion 28 of the sheath 14a is folded over the cord and may be held in its folded condition by being cemented to the exterior surface of the projection 26.

In Figure 3, a projection similar to that shown at 26 in Figure 2 is shown to be formed integrally with the hose wall 31. This projection 31a, like the one shown in Figure 2, has a channel or bore 32 passing therethrough and communicating with an opening 33 in the hose wall through which the cable surrounded by the sheath 34 may pass. In this particular modification, however, the sheath 34 is provided with a molded collar 35 which is of substantially larger circumference than the remainder of the sheath and which is made to register with a depression or cavity 36 within and about the channel or bore 32. This cavity 36 is of such dimensions that it will tightly receive the collar 35 and will therefore hold the same in its desired position and effect the fluid tight seal between the exterior of the hose and the interior passage. Where, as in the case of the preferred embodiments discussed herein, the projection and the sheath are composed of an elastomeric material, the dimensions of the cavity 36 may be slightly less than those of the collar 35 so that each of the collar and the cavity will be elastically deformed at the time they are placed together and the projection will tightly embrace the collar 35 and the sheath 34.

In Figures 4 and 5 still another modification of the present invention is shown wherein an integral projection 37 is shown rising from the hose wall 38 through which passes an opening 39 to allow for the passage of the cable 40 and the embracing sheath 41 therethrough. Once again, while the cable continues on through the opening 39 and the channel 42 through the integrally formed projection 37, the sheath itself is folded over the edge or rim of the projection at 43 and is allowed to extend along the exterior surface thereof. While an adhesive or other cement may be used for affixing the folded portion 43 of the sheath to the exterior surface of the projection 37, additional clamping means in the form of a clamping sleeve 44 may be positioned about the hose and so associated with the folded portions of the sheath and the projection 37 about which it is folded that the desired fluid tight seal will be effected. This sleeve 44 is of an annular shape to conform to the cylindrical configuration of the conduit about which it is to be positioned and has integrally formed therein a cap 45 which houses a depression 46 corresponding in size and configuration to the exterior surface of the projection 37 so that it will be firmly and closely received within the depression. The depression 46 has an opening or hole 47 through the base, so that once the sleeve is positioned about the hose and the cap 45 around the projection 37, opening 47 will register with the channel 42 of the projection and the opening 39 through the hose wall. The sleeve thus described, once positioned about the exterior of the conduit, will contact the folded portions 43 of the sheath 41 and will act to preserve the folded condition and the desired fluid tight seal resulting therefrom. The sleeve 44 is preferably composed of an elastomeric material which will allow for the original formation of the sleeve to an inside diameter slightly less than the outside diameter of the conduit about which it is to be positioned so that its positioning about the exterior of the conduit will cause it to be radially expanded within its elastic limit to elastically embrace the conduit and to urge the sheath into contact with the exterior surface of the projection 37 thereby establishing and preserving the desired fluid tight seal. The diameter of the opening 47 may be further closely controlled to equal the diameter of the cable 40 so that a secondary seal about the cable 40 may be further established.

In Figure 6, a protective inextensible strand 48 of relatively high tensile strength is employed along and co-extensively with the communication cable 50 preferably within the sheath 51 to protect the cable against exposure to damaging tension stresses. Since the use of this inextensible auxiliary strand 48 is employed and the cable will thereby be protected from stretching, the hose itself need not be reinforced against axial elongation and the hose body consisting simply of a corrugated elastomeric tube 49 may be employed. Once again it will be observed that the cable 50 and the sheath 51 therearound pass through a suitable opening 52 and an integrally formed projection 53 surrounding said opening and having a channel 54 communicating therewith; and the sheath 51 is folded back over the exterior surface of the projection. In this case, however, it will be noted further that the auxiliary strand 48 also passes through the opening and channel through the projection and is tied to the clamping ring 55. The ring 55 is of an elastomeric material and elastically embraces the folded portion of the sheath to clamp it to the projection 53. If desired, the cord 48 may be wrapped around the sheath and the ring 55 slipped over the wrappings.

In some cases, the cable 50 may contain an inextensible strand similar to strand 48, and the need for the separate strand will thus be eliminated.

In the assembly of the cable and the conduit units according to the present invention, the cable may be formed according to principles well known in the art and the sheath encircling the same applied before any association of the cable or the sheath with the conduit. The conduit, on the other hand, may also be made according to principles well known to the hose making art, and the openings through the wall thereof and the projections associated therewith may also be formed in accordance with well-known practices. Once the two individual components are thus completed, however, they may be united simply by positioning the cable within the conduit passage and pulling it through the openings through the walls defining the same whereupon the sheath may be cut if necessary and then folded back over the projections provided to effect the desired seal. Where adhesives are to be employed to hold the sheath in its desired position, particularly at points where it is folded about the exterior of the projections, the adhesives, may of course, be applied prior to the folding in the manner which is once again well known to the prior art.

While the present invention has been described above in particular detail in connection with certain specific preferred embodiments thereof, it is to be understood that the foregoing particularization has been for the purpose of illustration only and is no way intended to limit the scope or the principles of the invention as it is more precisely defined in the subjoined claims.

We claim:

1. A conduit and cable assembly comprising a conduit having a flexible, fluid impervious wall and a helical reinforcement defining a conduit passage interiorly thereof, at least one opening through said wall, an inextensible cable linearly positioned within said conduit passage, a fluid impervious sheath of resilient material enveloping said cable, a projection associated with and having a bore communicating with said opening, said cable and said sheath passing through said opening and said bore, said sheath being folded over the exterior of said projection, and means cooperating with said projection for securely and uniformly clamping the folded portion of said sheath to said projection.

2. A conduit and cable assembly comprising a conduit having a flexible fluid impervious wall and a helical reinforcement defining a conduit passage interiorly thereof, at least one opening through said wall, an inextensible cable linearly positioned within the conduit passage, a fluid impervious sheath enveloping said cable, an integral projection extending from the wall and having a bore communicating with said opening, said cable and said sheath passing through said opening and said bore, means for uniformly urging said projection into sealing relationship against said cable and said sheath, said sheath being folded over the exterior of said projection and said means.

3. A conduit and cable assembly comprising a conduit having a flexible fluid impervious wall and a helical reinforcement defining a conduit passage interiorly thereof, at least one opening through said wall, a cable linearly positioned within said conduit passage, a fluid impervious sheath of resilient material completely enveloping said cable within said passage, an integral projection of deformable material rising from the exterior of said wall and having a bore communicating with said opening, said cable and said sheath passing through said opening and said bore, a cord tightly wound about the exterior of said projection and urging it into contact with said sheath and said cable on a closed line about the outer periphery of said sheath, said sheath being folded back over the exterior surface of said projection and over said cord and means for preserving said sheath in its folded position.

4. A conduit and cable assembly comprising a flexible conduit having a fluid impervious wall and a helical reinforcement defining a conduit passage interiorly thereof, an opening through said wall, an annular bushing positioned within said conduit passage in the vicinity of said opening and having a projection with a bore therethrough passing through said opening to the exterior of said conduit, a sheath of resilient material enveloping said cable, said cable and said sheath passing through said bore, said sheath being folded over the exterior of said projection and clamping means for firmly and uniformly holding the folded portion of said sheath against said projection.

5. A conduit and cable assembly comprising a flexible conduit having a fluid impervious wall and a helical reinforcement defining a conduit passage interiorly thereof, an opening through said wall, a rigid annular bushing positioned within said conduit passage in the vicinity of said opening, having its exterior surface in uniform contact with said wall and having a projection with a bore therethrough passing through the said opening to the exterior of said conduit, a cable positioned within the conduit passage, a fluid impervious sheath of resilient material enveloping said cable, said cable and said sheath passing through said bore, said sheath being folded over the exterior of said projection and an annular sleeve about the exterior of said conduit wall opposite the portion of the interior thereof contacted by said bushing and urging said wall against said bushing.

6. A conduit and cable assembly comprising a flexible conduit having a fluid impervious wall and a helical reinforcement defining a conduit passage interiorly thereof, an opening through said wall, an annular bushing positioned within said conduit passage in the vicinity of said opening, the exterior of the annular bushing being in uniform contact with the periphery of said wall and having a projection with a channel therethrough passing through the opening in said wall to the exterior of said conduit, a cable positioned within the conduit passage, a fluid impervious sheath of resilient material enveloping said cable, said cable and said sheath passing through said channel and being folded over the exterior of the surface of said projection surrounding said channel and an annular elastomeric sleeve uniformly embracing the exterior surface of said wall about the circumference of at least that part thereof which is contacted about its inner periphery by said bushing, said sleeve having a depression therein, the dimensions of which substantially conform to the dimensions of said projection and having a hole therethrough communicating with said depression and with said channel, and having said cable passing through said hole.

7. A conduit and cable assembly including a flexible fluid impervious conduit comprising a helical reinforcement and an elastomeric tube therearound, an opening in said tube, a projection on said tube and having a bore communicating with said opening, a cable linearly positioned within the passage of said conduit, a fluid impervious tubular sheath enveloping said cable, an inextensible strand linearly positioned with said sheath and having clamping means associated with at least one end thereof, said cable, said sheath and said strand passing through said opening and said bore, said sheath being folded over said projection and lying along the exterior surface thereof and said clamping means tightly embracing the folded portion of said sheath and urging it against the exterior surface of said projection and holding said strand in a substantially taut condition.

8. A conduit and cable assembly according to claim 7 wherein said clamping means are in the form of a ring having an inside diameter substantially equal to the outside diameter of said projection covered by the folded portion of said sheath.

9. A conduit and cable assembly including a flexible fluid impervious conduit comprising a helical reinforcement and elastomeric tube therearound, an opening in said tube, a projection on said tube and having a bore communicating with said opening, a cable linearly positioned within the passage of said conduit, a fluid impervious tubular sheath enveloping said cable, said cable and said sheath passing through said opening and said bore, said sheath having a continuous projecting collar about the exterior surface thereof, said projection having a depression about the inner surface thereof defining said bore, said depression substantially conforming in size and shape to the size and shape of said collar and said collar being positioned within and occupying said depression.

References Cited in the file of this patent
UNITED STATES PATENTS

| | | |
|---|---|---|
| 2,511,497 | Dauphinee | June 13, 1950 |
| 2,602,608 | Darling | July 8, 1952 |
| 2,733,734 | Woodward et al. | Feb. 7, 1956 |